United States Patent [19]

Sakakibara et al.

[11] Patent Number: 5,428,961
[45] Date of Patent: Jul. 4, 1995

[54] MICROMACHINES

[75] Inventors: Takahisa Sakakibara; Hiroaki Izu; Seiichi Kiyama; Hitoshi Hirano; Keiichi Kuramoto; Yoichi Domoto; Hiroshi Hosokawa; Takashi Kuwahara; Yasuaki Yamamoto; Akira Terakawa; Keiichi Sano; Satoshi Ishida; Ikuro Nakane; Koji Nishio, all of Moriguchi, Japan

[73] Assignee: Sanyo Electric Co., Ltd., Osaka, Japan

[21] Appl. No.: 95,770

[22] Filed: Jul. 19, 1993

[30] Foreign Application Priority Data

Jul. 21, 1992 [JP] Japan .................. 4-192589
Jul. 23, 1992 [JP] Japan .................. 4-196856
Jul. 23, 1992 [JP] Japan .................. 4-196857

[51] Int. Cl.$^6$ ............................ H02N 11/00
[52] U.S. Cl. ........................ 60/698; 60/721; 290/1 R
[58] Field of Search ............. 60/721, 698; 290/1 R

[56] References Cited

U.S. PATENT DOCUMENTS 5,262,695 11/1993 Kuwano et al. .................. 310/309

Primary Examiner—Ira S. Lazarus
Assistant Examiner—L. Heyman
Attorney, Agent, or Firm—Armstrong, Westerman, Hattori, McLeland & Naughton

[57] ABSTRACT

The body of a micromachine has a plurality of energy-power converting means for receiving different forms of energy including rays, microwaves and sound waves and converting the different forms of energy to electric power, i.e., photoelectromotive devices, a microwave-power converter and an acousto-electromotive device. The electric power obtained by these means is supplied to a drive system and an operation system incorporated in the machine body.

9 Claims, 8 Drawing Sheets

MICROMACHINES

FIELD OF THE INVENTION

The present invention relates to micromachines which are several millimeters or smaller in size, and more particularly to micromachines which are adapted to receive supplies of energy from outside without using any cable.

BACKGROUND OF THE INVENTION

In recent years, so-called micromachines have been proposed which are several millimeters or smaller in size, and various research and developing efforts have been made for introducing micromachines into actual use.

Heretofore known as the methods of driving micromachines are the cable method wherein a cable is used for supplying energy (electric power) and control signals from outside to the body of the machine which has various actuators, and the cableless method wherein control signals only are wirelessly fed from outside to the machine body which is internally provided with a battery or like energy source.

When having the cable, the micromachine has an energy source outside of its body. This leads to the advantage of making the machine body compact and affording greater freedom in designing the micromachine since the amount of drive energy is not limited, whereas the cable which is indispensable to the supply of energy imposes limitations on the range of movement of the machine as well as on the motion thereof.

When cableless, on the other hand, the micromachine is movable without limitations, but the need to mount the energy source thereon makes the machine body larger and heavier to impair the contemplated function of the micromachine.

Accordingly, we have made research on cableless micromachines which have no energy source mounted on the machine body and to which energy is applied from outside cablelessly by applying rays or like electromagnetic waves to the machine body. In this case, the surface of the machine body is covered with photoelectromotive devices such as solar cells for converting the electromagnetic waves applied to an electric power.

However, micromachines are compacted to the greatest possible extent and are therefore limited in the area for receiving electromagnetic waves (light receiving area). Moreover, solar cells or like photoelectromotive devices are presently as low as up to about 20 to about 30% in electric power conversion efficiency. Accordingly, if the micromachine is heavily loaded for the function to be performed, it is likely that the electromotive force of the photoelectromotive devices will be insufficient to meet the power requirement. Further when the micromachine passes through a location where rays are not accessible, a temporary power failure will occur.

In the case where the cableless micromachine is inserted into a pipe, for example, for inspecting the pipe wall with a supply of electromagnetic waves to the micromachine within the pipe, the source for emitting electromagnetic waves is installed at the inlet of the pipe, so that the intensity of energy of electromagnetic waves reaching the micromachine decreases with the inward travel of the micromachine. Even if the micromachine can be moved to a predetermined position, the electric power available is likely to be insufficient for the machine to perform the intended operation, such as pipe wall inspection, at the position.

Although a majority of light energy remaining unconverted to power by the photoelectromotive devices changes into heat, there arises the problem that the heat generated is confined within the micromachine because the micromachine has a very small outer wall surface area for dissipating heat and highly integrated mechanisms and electronic circuits. This results in a rise in the internal temperature to lower the power conversion efficiency of the photoelectromotive devices and is also likely to entail a malfunction of the electronic circuit for performing the contemplated function or operation of the micromachine.

SUMMARY OF THE INVENTION

An object of the present invention is to provide an electric power system which is unlikely to result in a power shortage for use in cableless micromachines.

Another object of the present invention is to provide a micromachine which is adapted to prevent heat from being confined in its interior by reducing the rise in the temperature of photoelectromotive devices and the internal circuit.

The present invention provides a micromachine which has mounted on the body thereof a plurality of energy-power converting means for receiving different forms of energy including rays, microwaves and sound waves and converting the different forms of energy to electric power.

When required, the micromachine is provided with means for accumulating the electric power obtained from the energy-power converting means.

With the above electric power system, one of the energy-power converting means comprises, for example, photoelectromotive devices which may be provided over the entire surface of the body of the micromachine. Even in this case, the machine body can be additionally provided with another one of the energy-power converting means such as a microwave-power converter, whereby the micromachine can be supplied with a large amount of energy in excess of the maximum amount of energy to be supplied by rays.

Further when a sound wave generator, for example, is disposed in the vicinity of a predetermined position where the micromachine is to perform the contemplated operation so as to radiate toward the micromachine rays which are one form of energy, the sound waves reach the micromachine almost without attenuation to supply a sufficient amount of power for the contemplated operation.

Further when the micromachine is provided with the means for accumulating the power as converted by the energy-power converting means, the accumulating means can be charged while the power consumption is low and can be discharged when required to temporarily supply a large amount of electric power.

With the micromachine described, a greater electromotive force is available than when all the electric power is afforded by a photoelectromotive force, hence no likelihood of a power shortage.

The micromachine embodying the present invention further comprises a self-locomotive mechanism for causing the micromachine to travel through constricted portions by itself, and a heat sink having a base end in contact with a heat generating portion inside the machine body and an outer end projecting outward from the machine body to come into contact with the wall surface of the constricted portion. The heat sink can be provided by a plurality of drive legs for moving the machine body by kicking the wall surface of the constructed portion.

The heat produced by the heat generating portion is transmitted from the base end of the heat sink toward the outer end thereof and dissipated to the wall surface of the constricted portion with which the outer end of the heat sink is in contact. Since the heat generating portion and the constricted portion wall surface are connected together directly by the heat sink at this time, the heat is transferred very efficiently by solid-to-solid heat conduction. Thus, the heat can be dissipated more effectively than when dissipated spontaneously from the machine outer wall.

The present invention further provides a micromachine which comprises an electronic circuit for performing a predetermined operation, photoelectromotive devices covering an outer peripheral surface of the body of the micromachine, and chemical cells provided inside the machine body and arranged on the rear side of the respective photoelectromotive devices back to back to supply an electromotive force from the devices and the chemical cells to the electronic circuit. When secondary cells are used as the chemical cells, the chemical cells can be charged with the electromotive force of the photoelectromotive devices.

With the micromachine described, a discharge of the chemical cells supplies power to the electronic circuit. When secondary cells are used as the chemical cells, an excess of power during underloading is accumulated in the chemical cells, such that for example when the radiation of rays is interrupted, required power is supplied by discharging the chemical cells.

When irradiated with rays, the photoelectromotive devices produce heat, which is nevertheless transmitted to the chemical cells and absorbed by the heat capacity of the cells since the chemical cells are arranged in intimate contact with the rear side of the photoelectromotive devices. Accordingly, the rise in the temperature of the photoelectromotive devices is smaller than in the conventional arrangement of such devices including no chemical cells.

It is known that chemical cells generally exhibit a higher utilization rate of the positive electrode with a rise in temperature. The rise in the temperature of the chemical cell due to the heat produced by the photoelectromotive device therefore permits the discharge of the chemical cell for a longer period of time for a continued power supply even when the radiation of rays is interrupted.

With the micromachine described, the arrangement of chemical cells reduces the rise in the temperature of the photoelectromotive devices and the internal circuit and ensures a stabilized power supply, thus obviating the conventional problems of circuit malfunctioning and power shortage.

DETAILED DESCRIPTION OF EMBODIMENTS

Figure 1:
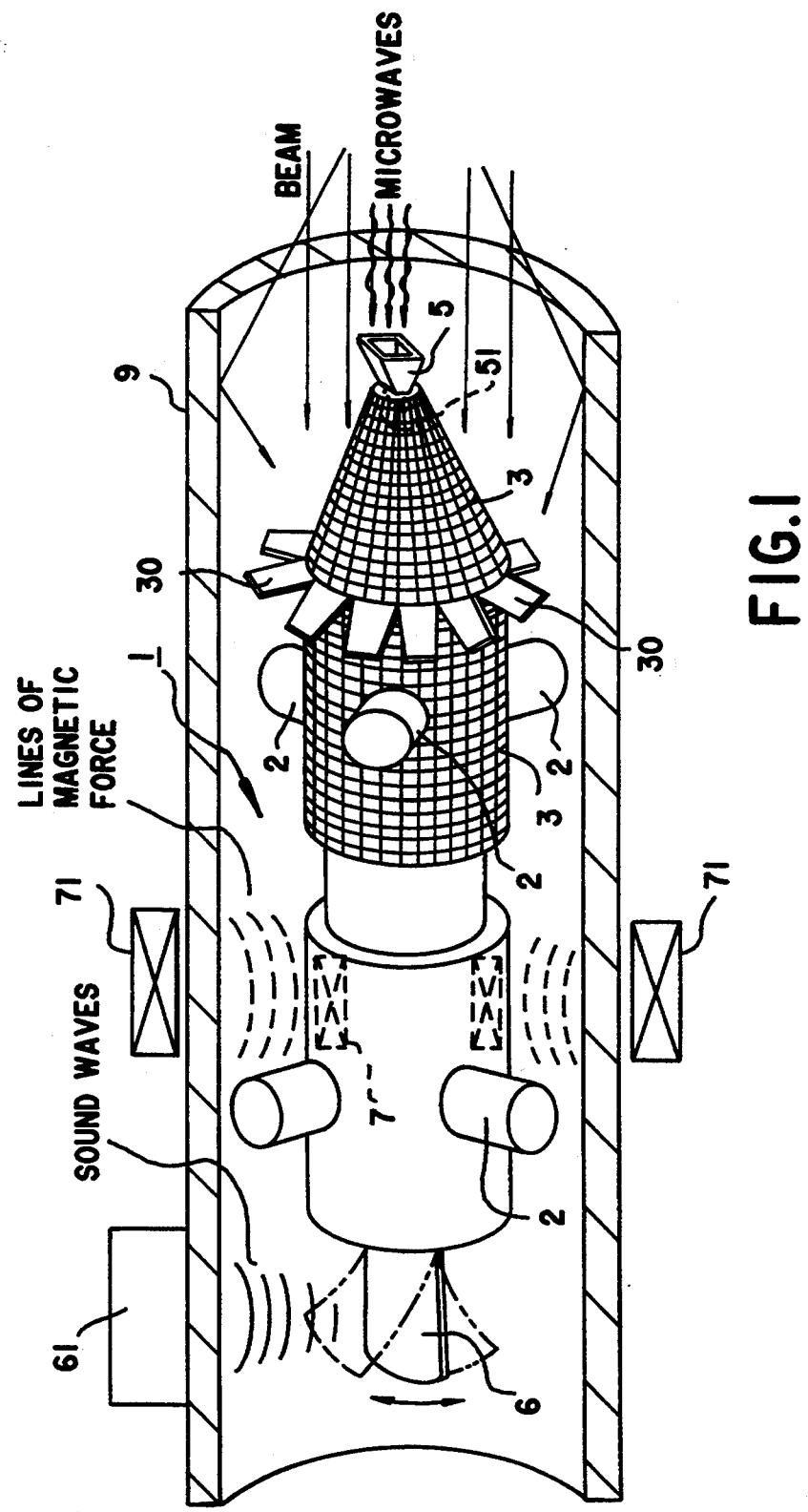
FIG. 1 is a perspective view partly broken away and showing the construction of a micromachine embodying the invention.

FIG. 1 shows a micromachine 1 which is inserted into a pipe 9 having a diameter of about 5 to about 10 mm for performing a predetermined operation such as inspection of the pipe wall. The micromachine 1 is movable forward or rearward within the pipe 9 by stretching or contraction of a plurality of drive legs 2 and the body of the machine.

According to the present embodiment, four different forms of energy, i.e., laser beams, microwaves, sound waves and lines of magnetic forces, are used as the energy to be applied to the micromachine from outside.

The body of the micromachine 1 comprises a stretchable tubular trunk portion and a tapered portion projecting from the front end of the trunk portion. A multiplicity of photoelectromotive devices 3 are arranged over and cover the surfaces of the trunk portion and the tapered portion for converting to electric power the laser beam to be supplied from outside the machine.

Figure 2:
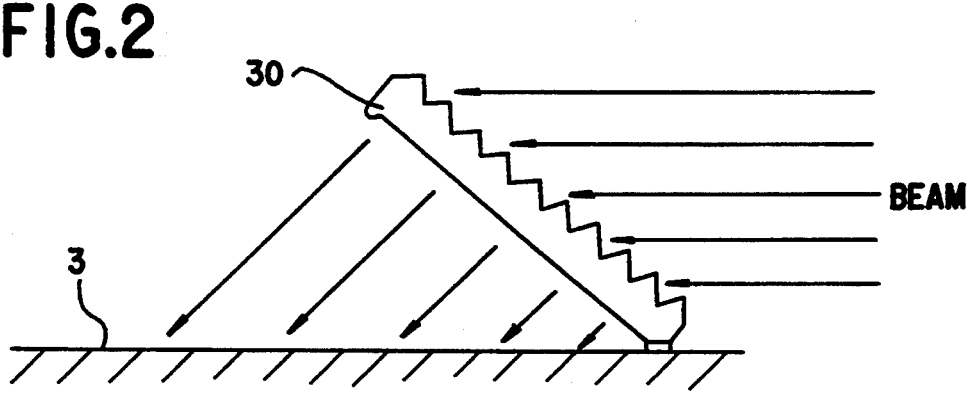
FIG. 2 is a diagram for illustrating the operation of a diffraction grating plate.

The machine body has a plurality of diffraction grating panels 30 projecting from the boundary between the tubular portion and the tapered portion toward the inner wall of the pipe 9, whereby the beam advancing toward the space inside the pipe around the body tubular portion axially of the pipe is refracted toward the photoelectromotive devices 3 over the surface of the trunk portion as shown in FIG. 2 so that an increased amount of light impinges on the devices 3.

Figure 3:
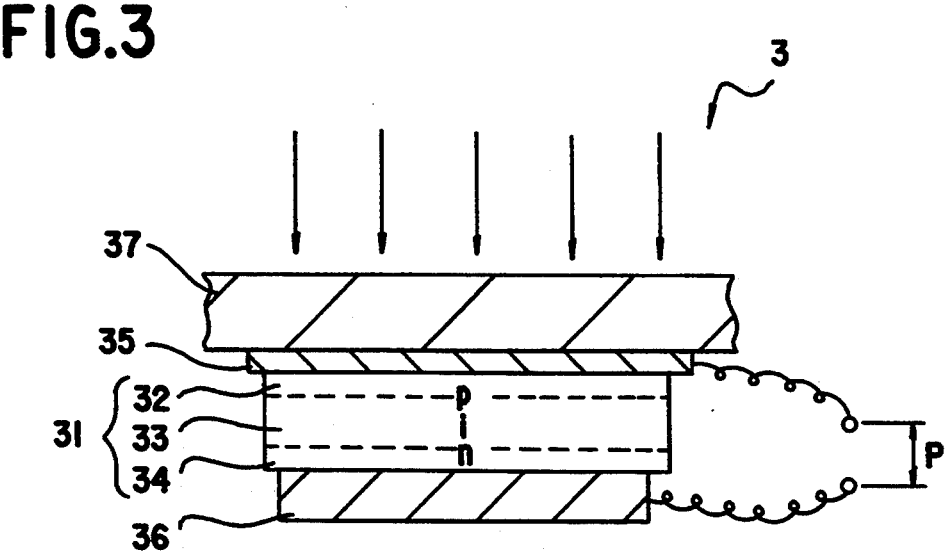
FIG. 3 is an enlarged sectional view showing the construction of a photoelectromotive device.

With reference to FIG. 3, the photoelectromotive device 3 is an a-Si solar cell comprising a transparent electrode 35, a-Si substrate 31 and rear electrode 36 which are formed in superposed layers over a transparent insulating substrate 37, for example, by the plasma CVD process. The a-Si substrate 31 has a known joined structure comprising a p layer 32 about $150 \times 10^{-8}$ cm in thickness, i layer 33 about 5000 to $10000 \times 10^{-8}$ cm in thickness and n layer 34 about $500 \times 10^{-8}$ cm in thickness.

For example in the case where the intensity of incident light is 1 mW/mm², the light receiving area is 50 mm² and the conversion efficiency is 30%, the device 3 produces electric power P of about 15 mW across the transparent electrode 35 and the rear electrode 36.

Further with reference to FIG. 1, the micromachine 1 is provided at the forward end of its body with an antenna 5 for receiving microwaves providing a second form of energy. The microwaves received are fed to a microwave-power converter 51 via the antenna.

The microwave-power converter 51 comprises, for example, a monolithic microwave IC and affords an output of 24 mW in the case where the electric power of microwaves supplied from outside is 2 mW/mm$^2$, the wave receiving area is 20 mm$^2$ and the antenna efficiency is 60%.

Mounted on the outer wall of the pipe 9 is a sound wave generator 61 for producing supersonic waves serving as a third form of energy. The supersonic waves from the generator 61 are radiated into the pipe 9 through the pipe wall and reach an acousto-electromotive device 6 projecting from the rear end of the body of the micromachine 1. The acousto-electromotive device 6 comprises a vibrating plate of piezoelectric material. The device 6 produces electric power of 1 mW, for example, in the case where the intensity of incident sound waves is 20 mW/mm$^2$, the sound receiving area is 25 mm$^2$ and the conversion efficiency is 0.2%.

Further provided around the pipe 9 is a primary winding 71 for radiating lines of magnetic force serving as a fourth form of energy. On the other hand, a secondary winding 7 electromagnetically coupled to the primary winding 71 is disposed inside the micromachine 1.

An ac power supply, when connected to the primary winding 71, induces an electromotive force in the secondary winding 7. For example, the output of the secondary winding 7 is adjusted with an input magnetic field for the secondary winding 7 of 325 T and a winding gap of 2 mm. When it is assumed that an Ni-Cd cell measuring 13.5 mm in diameter and 3.5 mm in length is to be charged, the arrangement gives electric power of about 3.75 mW.

Figure 5A:
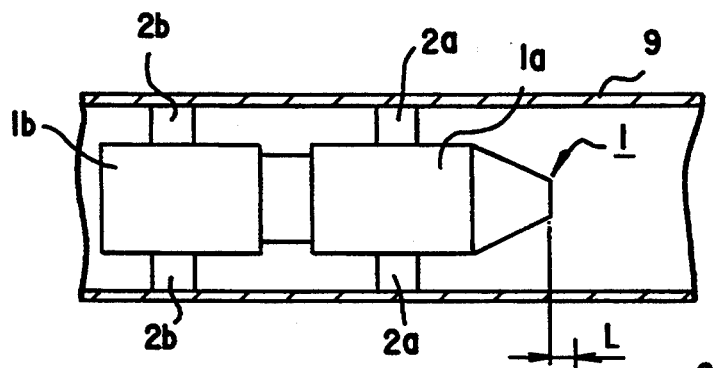
FIGS. 5, (a), (b) and (c) are a series of side elevations showing self-locomotion of the micromachine.
Figure 5B:
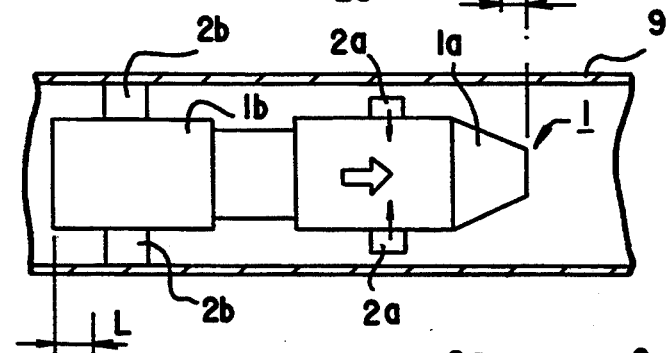
Figure 5C:
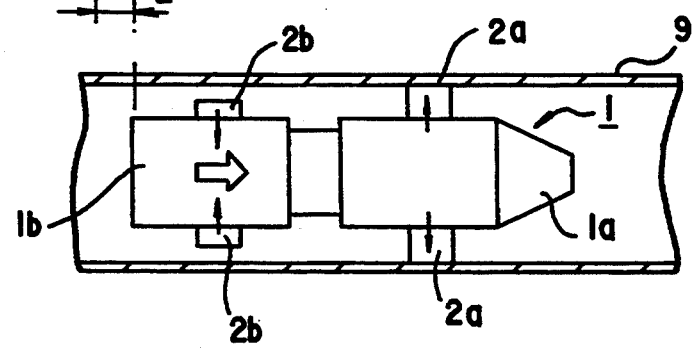

FIG. 5 shows a self-locomotion mechanism for the micromachine 1. The machine body comprises a front body portion 1a and a rear body portion 1b which are movable relative to each other to render the machine body stretchable. The front body portion 1a and the rear body portion 1b have projecting from their outer peripheries a plurality of stretchable front drive legs 2a and a plurality of stretchable rear drive legs 2b, respectively.

Figure 4:
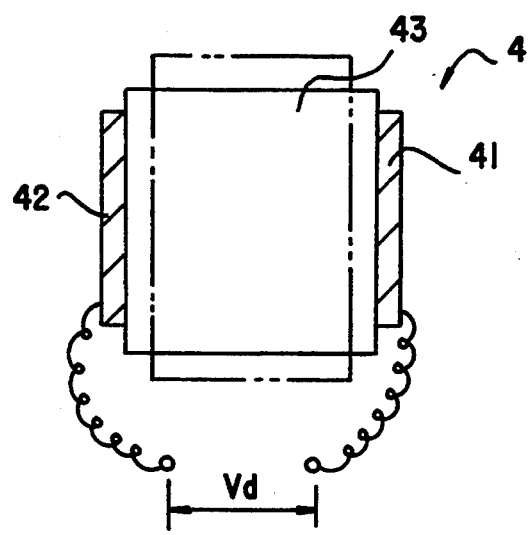
FIG. 4 is a front view schematically showing the construction of a piezoelectric actuator.

FIG. 4 shows a piezoelectric actuator 4 comprising superposed layers usable as a stretching drive mechanism for the machine body and the drive legs.

The piezoelectric actuator 4 comprises a positive electrode 41 and a negative electrode 42 which are opposed to each other, and a piezoelectric ceramic piece 43 sandwiched between these electrodes. When a predetermined voltage Vd is applied across the two electrodes 41, 42, the ceramic piece 43 stretches or contracts as indicated in a broken line.

The power for applying the voltage to the actuator 4 is afforded by the electromotive force of the above-mentioned photoelectromotive devices 3.

The micromachine 1 advances in the following manner. FIG. 5 (a) shows the machine body as contracted with the front body portion 1a and the rear body portion 1b drawn toward each other. The front drive legs 2a and the rear drive legs 2b are in a projecting state, with the outer end of each leg in pressing contact with the inner wall of the pipe 9. In this state, the front drive legs 2a are contracted, and the front body portion 1a is moved forward as seen in FIG. 5 (b).

Next as shown in FIG. 5 (c), the front drive legs 2a are stretched to bring their outer ends into pressing contact with the pipe inner wall, and the rear body portion 1b is drawn toward the front body portion 1a with the rear drive legs 2b in a contracted state. The rear drive legs 2b are thereafter stretched for the machine body to resume the state of FIG. 5 (a).

The process described advances the micromachine 1 by an amount of stretch or contraction L of the machine body, i.e., the amount of movement, L, of the front body portion 1a and the rear body portion 1b relative to each other. The micromachine advances continuously by repeating the process. The machine is movable rearward similarly.

Figure 6:
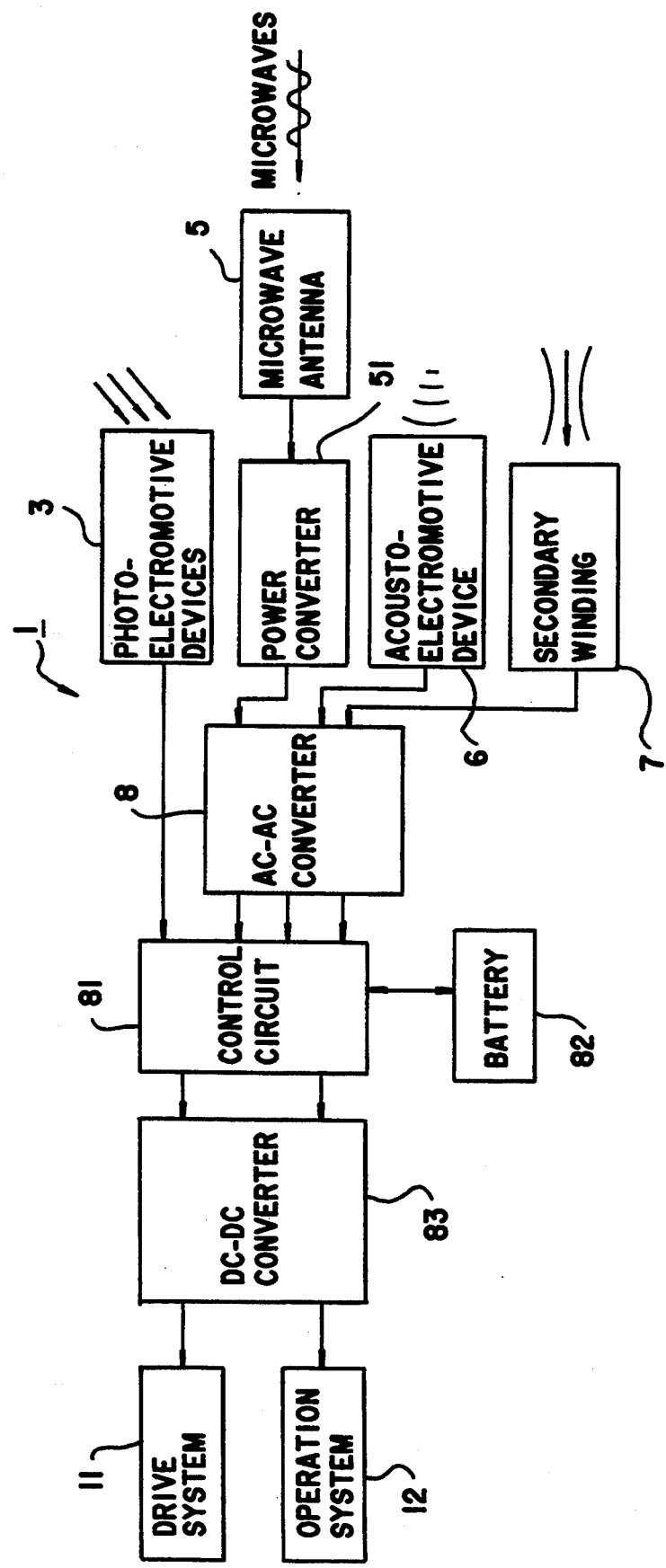
FIG. 6 is a block diagram showing the construction of a circuit of the micromachine embodying the invention.

FIG. 6 shows the construction of circuit of the micromachine 1. The output of the photoelectromotive devices 3 is fed to a control circuit 81. The output of each of the microwave-power converter 51, acousto-electromotive device 6 and secondary winding 7 is converted by an AC-DC converter 8 to a direct current, which is then fed to the control circuit 81.

The control circuit 81 serves to dividedly supply required electric power to a drive system 11 including the piezoelectric actuators constituting the foregoing self-locomotion mechanism, and an operation system 12 for realizing the contemplated operation or function of the micromachine 1, such as inspection of the pipe wall. The output of the control circuit 81 is fed to a DC-DC converter 83 for voltage adjustment or the like and fed to the drive system 11 and the operation system 12.

Connected to the control circuit 81 is a battery 82 such as Ni-Cd cell or lithium secondary cell for accumulating an excess of electric power.

When the micromachine 1 receives all the supplies of energy, a maximum output of more than 40 mW is available which enables the machine to perform an operation of high load which is difficult to conduct, for example, with the power supply from the photoelectromotive devices 3 only.

The excessive electric power resulting from underloading is accumulated in the battery 82 under the control of the control circuit 81, such that the battery 82 can be discharged for a high load to supply the power required.

When the sound wave generator 61 or the primary winding 71 of FIG. 1 is made movable to follow the locomotion of the micromachine 1, a higher power conversion efficiency can be achieved, whereas the provision of the battery 82 in the micromachine 1 makes it possible to install the sound wave generator 61 or the primary winding 71 in an optional position to provide a power supply station at the position.

With the foregoing embodiment, the different forms of energy are used collectively as a common power source, but one form of energy can be distinguished from another according to the characteristics of each form of energy, e.g., according to the voltage value, for more efficient use of energy. Further electric power lines are usable as another form of energy.

Figure 7:
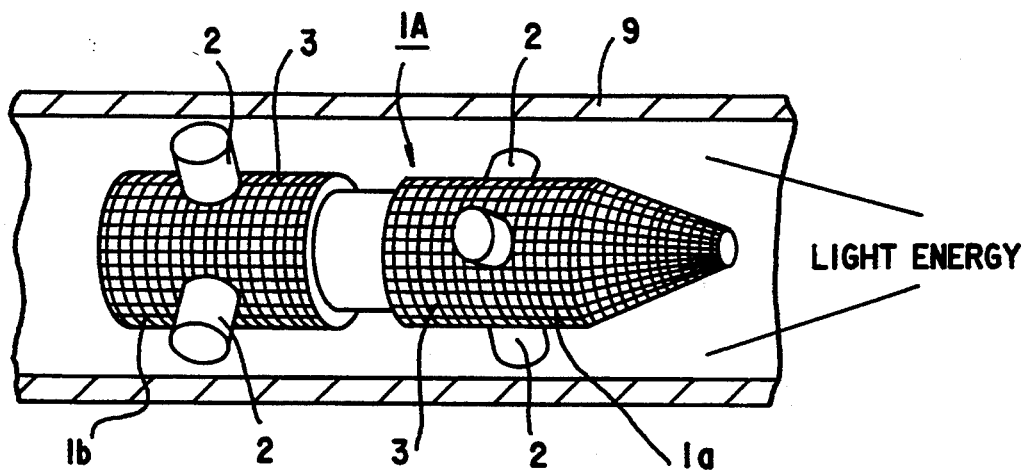
FIG. 7 is a perspective view showing the appearance of a micromachine having a heat sink.

FIG. 7 shows another micromachine, for which a laser beam is used as a form of energy to be applied from outside, and the surface of the micromachine, indicated at 1A, is covered with a multiplicity of photoelectromotive devices 3 for converting the light energy of the laser beam. The device 3 is an a-Si solar cell of the construction shown in FIG. 3. The micromachine 1A has a self-locomotion mechanism which comprises the stretching drive mechanism shown in FIGS. 4 and 5.

Figure 8:
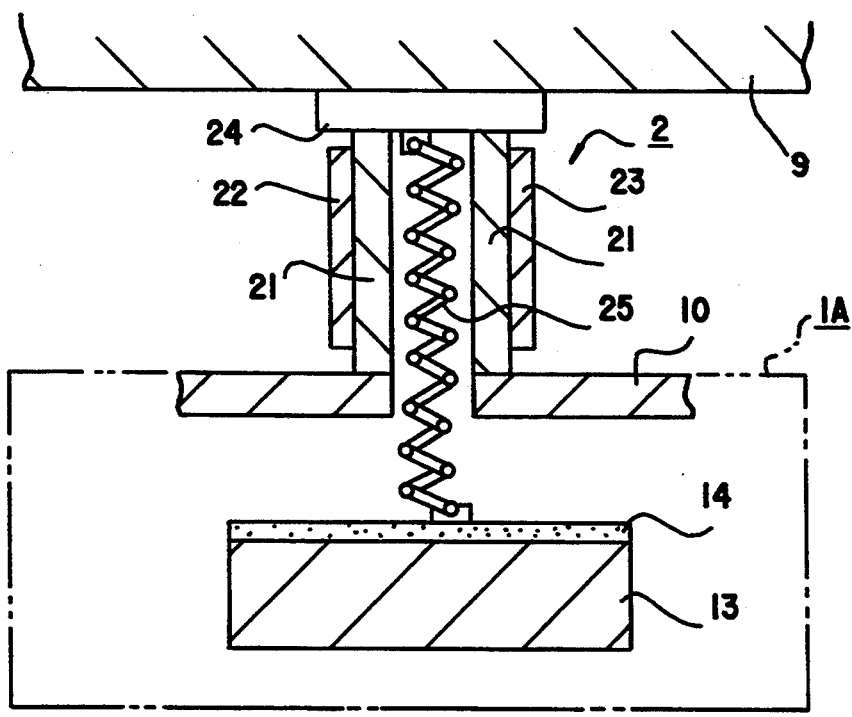
FIG. 8 is a sectional view showing in detail the construction of a drive leg serving also as a heat sink.

FIG. 8 shows a drive leg 2 serving also as a heat sink. The body of the machine has incorporated therein an electronic circuit 13 for realizing various contemplated operations or functions of the micromachine 1A. The circuit 13 has a surface covered with an insulating film 14 having a thickness of about 1 to about 2 micrometers.

The drive leg 2, which constitutes a piezoelectric actutator having superposed layers, comprises a piezoelectric ceramic tube 21 having a base end fixed to the outer wall 10 of the machine body, an electrically non-conductive contact piece 24 secured to the outer end of the ceramic tube 21, and a pair of electrodes 22 and 23 arranged on opposite sides of the ceramic tube 21. The contact piece 24 has an outer-end cylindrical surface which is fittable to the inner surface of a pipe 9 in intimate contact therewith.

The piezoelectric tube 21 providing the drive leg 2 has inside thereof a stretchable connector 25 having a base end pivoted to the insulating film 14 of the electronic circuit 13 and an outer end pivoted to the contact piece 24. The connector 25 is made of a material of high heat conductivity, such as Cu, Ag, Au, Al or the like.

Accordingly, the heat produced by the electronic circuit 13 is efficiently dissipated to the inner wall of the pipe 9 through the stretchable connector 25 and the contact piece 24. Further the heat produced from the photoelectromotive device constituting part of the outer wall 10 of the machine unit is dissipated to the inner wall of the pipe 9 through the ceramic tube 21 and the contact piece 24.

The connector 25 is free to stretch or contract and therefore will not impede stretching or contraction of the drive leg 2.

Figure 9A:
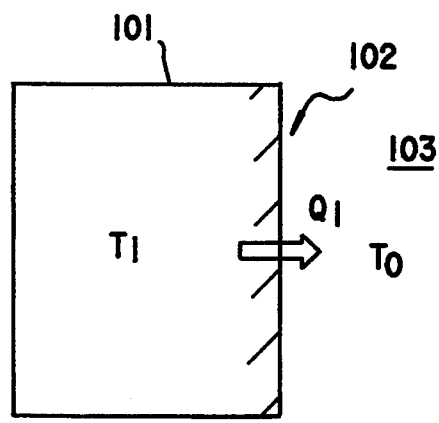
FIGS. 9, (a) and (b) are diagrams for illustrating heat dissipating models of the prior art and the present invention.
Figure 9B:
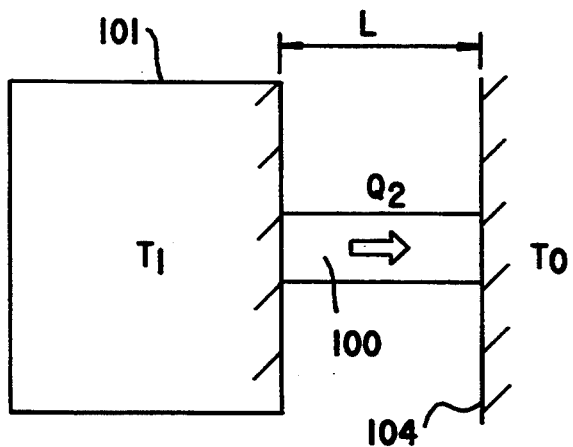

The amount of heat dissipated, for example, from the conventional micromachine of the spontaneous heat dissipation type will be considered with reference to FIG. 9 (a) which shows a model wherein Q1 is the amount of heat transfer involved in the case where heat is dissipated from a heat disposal surface 102 of a heat generating portion 101 having a temperature of T1 to an adjacent medium 103 having a temperature of T0. The amount of heat dissipated from the micromachine of the present invention will be considered with reference to FIG. 9 (b) which shows a model wherein Q2 is the amount of heat transfer involved in the case where heat is dissipated from a heating portion 101 with the temperature T1 to an outer wall 104 having the temperature T0 through a heat sink 100. The ratio between the amounts of heat transfer Q2/Q1 is calculated as follows.

First, the amount of heat transfer Q1 in the case of FIG. 9 (a) is expressed by Equation 1 given below wherein A1 is the area of the heat disposal surface 102, and h is the coefficient of heat transfer from the heat disposal surface 102 to the medium 103.

$$Q1 = hA1(T1 - T0) \qquad \text{Equation 1}$$

On the other hand, the amount of heat transfer Q2 through the heat sink 100 in the case of FIG. 9 (b) is expressed by Equation 2 given below wherein L, A2 and λ are the length, cross sectional area and heat conductivity of the heat sink 100, respectively.

$$Q2 = \lambda A2(T1 - T0)/L \qquad \text{Equation 2}$$

Accordingly, the ratio between the amounts of heat transfer Q2/Q1 is expressed by the following Equation 3.

$$Q2/Q1 = \lambda A2/hA1L \qquad \text{Equation 3}$$

Now, suppose the medium 103 is air, the heat sink 100 is made of copper, the heat transfer coefficient h is 10 W/m$^2$K, the heat conductivity λ is 400 W/mK, the length L is $1 \times 10^{-4}$ m, and the area ratio A2/A1 is $1 \times 10^{-2}$. The ratio Q2/Q1 is then $4 \times 10^3$.

In brief, the construction of the invention shown in FIG. 9 (b) achieves 4000 times the heat dissipation effect attained by the conventional case shown in FIG. 9 (a).

With the micromachine of FIG. 7, the heat produced inside the machine body is efficiently transferred to the inner wall 9 through the drive leg 2 serving also as a heat sink as described above, hence a sufficiently high heat dissipation effect.

During the locomotion of the micromachine 1A, the drive leg 2 repeatedly comes into and out of contact with the inner wall of the pipe 9. Since the contact state is maintained for a given period of time, a heat dissipation effect higher than in the prior art can be obtained even when heat dissipation only during the contact is considered.

Further even while the drive leg 2 is out of contact with the pipe wall, the peripheral surface of the leg 2 serves as a heat disposal surface for the transfer of heat to the surrounding medium. This also produces a heat dissipating effect. In contrast, the conventional drive leg is not in direct contact with the heat generating portion, so that heat will not be transferred from this portion to the drive leg efficiently, hence a low heat dissipation effect.

The leg shown in FIG. 8 includes the stretchable connector 25 as a heat sink member, whereas the heat sink achieves a further improved heat dissipation effect if comprising a forcible heat transfer system wherein a liquid or like flowable heat medium is used. Although the heat sink of the foregoing embodiment is provided by the drive leg 2, a heat sink specifically designed as such can be used separately from the drive leg 2.

Figure 10:
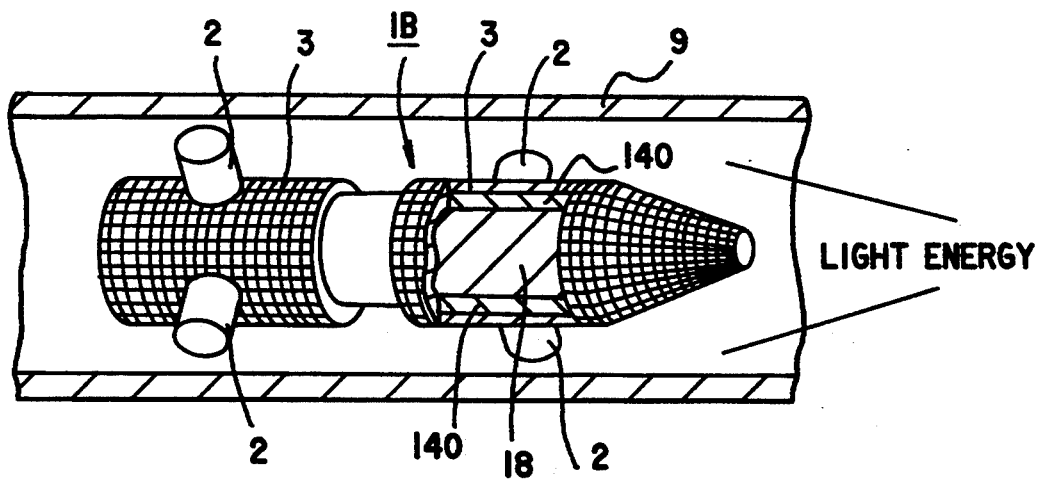
FIG. 10 is a perspective view partly broken away and showing a micromachine having chemical cells.

FIG. 10 shows another micromachine 1B having photoelectromotive devices 3 covering the surface thereof. The device 3 is an a-Si solar cell shown in FIG. 11. Like those already described, the device 3 comprises a transparent electrode 35, a-Si layer 31 and rear electrode 36 of aluminum which are superposed in layers over a transparent insulating substrate 37. A terminal piece 38 of aluminum is formed on the transparent electrode 35. A positive output is obtained at the terminal piece, and a negative output at the rear electrode 36.

Figure 11:
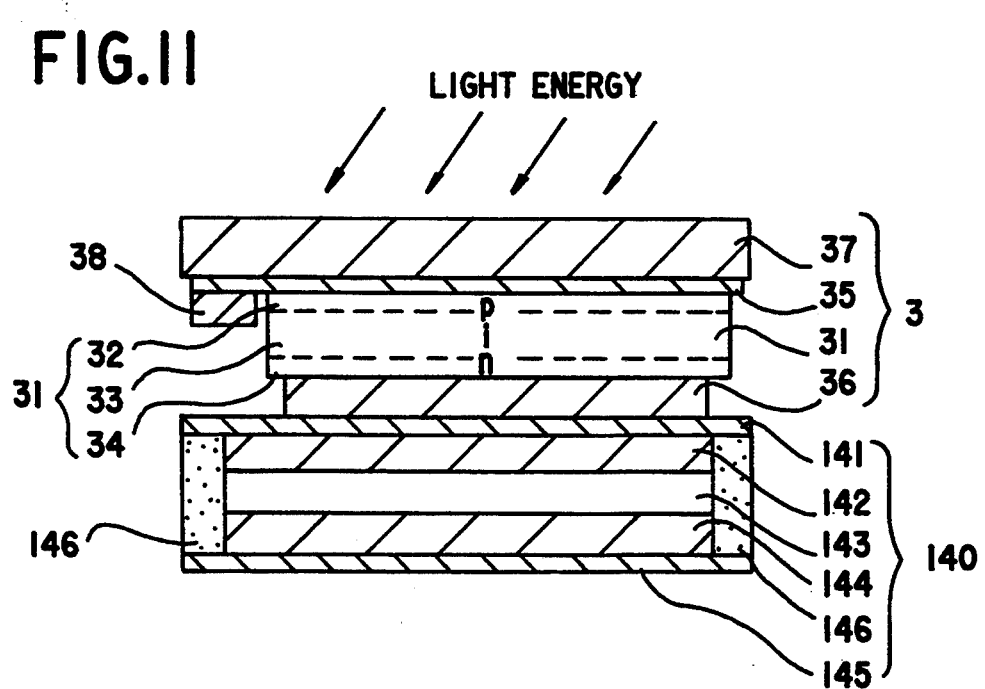
FIG. 11 is an enlarged view in section of a photoelectromotive device and a chemical cell.

A chemical cell 140 is provided on the rear side of the photoelectromotive device 3 in intimate contact therewith. The cell 140 is a lithium secondary cell in the form of a planar plate about 1 mm in thickness. As seen in FIG. 11, an electrolyte layer 143 is sandwiched between a negative electrode layer 142 and a positive electrode layer 144, and this arrangement is held between a negative electrode can 141 and a positive electrode can 145 which are interconnected by insulators 146, 146 to provide a closed structure.

The negative electrode layer 142 is made of lithium or a lithium alloy. The positive electrode layer 144 comprises a manganese oxide serving as an active substance, electrically conductive agent of acetylene black and fluorocarbon resin binder which are mixed together in the ratio (by weight) of 80:10:10 and molded.

The electrolyte layer 143 comprises a solid high-polymer lithium ion electroconductor which is prepared by admixing a lithium salt, i.e., LiClO₄, with polyethylene oxide. The cans 141 and 145 are made of stainless steel.

Various lithium salts such as LiBF₄ and LiCF₃SO₃ are usable in place of LiClO₄ for the electrolyte layer 143. A polyester, polyimine or the like can be used instead of polyethylene oxide.

The electrolyte layer 143 is not limited to a solid but a liquid electrolyte such as propylene carbonate or ethylene carbonate is alternatively usable. Also usable is an electrolyte gel prepared by adding a plasticizer, such as polymethyl methacrylate or polyacrylonitrile, to such a liquid electrolyte.

Figure 12:
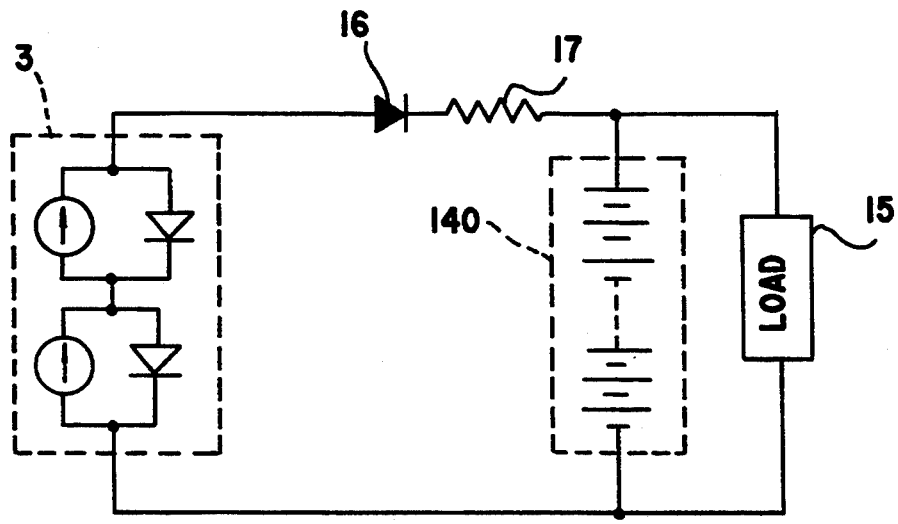
FIG. 12 is an equivalent circuit diagram of an electric power supply system.

The photoelectromotive devices 3 and chemical cells 140 are electrically connected together as seen in FIG. 12 to provide a power supply system. The current from the decides 3 is fed to a load 15, such as the above-mentioned internal circuit, via a reverse flow preventing diode 16 and a current limiting resistor 17 and also to the chemical cells 140 to charge the cells 140 with an excess of electric power.

The micromachine 1B has a self-locomotion mechanism which similarly comprises the same stretching drive mechanism shown in FIGS. 4 and 5. Piezoelectric actuators 4 the same as those already described are incorporated as the load 15 of FIG. 12 into the power supply system.

With the micromachine 1B described, the heat produced by the photoelectromotive devices 3 is transmitted directly to the chemical cells 140, the heat capacity of which suppresses a rise in the temperature of the devices 3.

Figure 13:
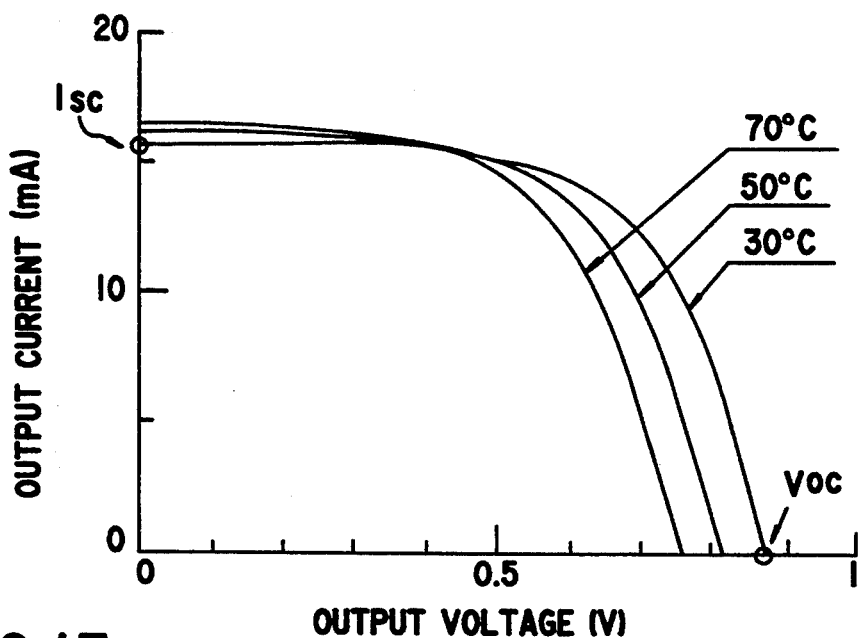
FIG. 13 is a graph showing the characteristics of the photoelectromotive device.

FIG. 13 shows the current-voltage characteristics of the a-Si solar cell providing the photoelectromotive device 3. The graph reveals that with rising temperature, the short-circuit current Isc increases when the load is zero, but the open-circuit voltage Voc more greatly reduces to result in a lower conversion efficiency. For example, when the temperature rises by 1° C., the conversion efficiency decreases by 0.2 to 0.3%. Accordingly, it is desirable to operate the device 3 at the lowest possible temperature.

Figure 14:
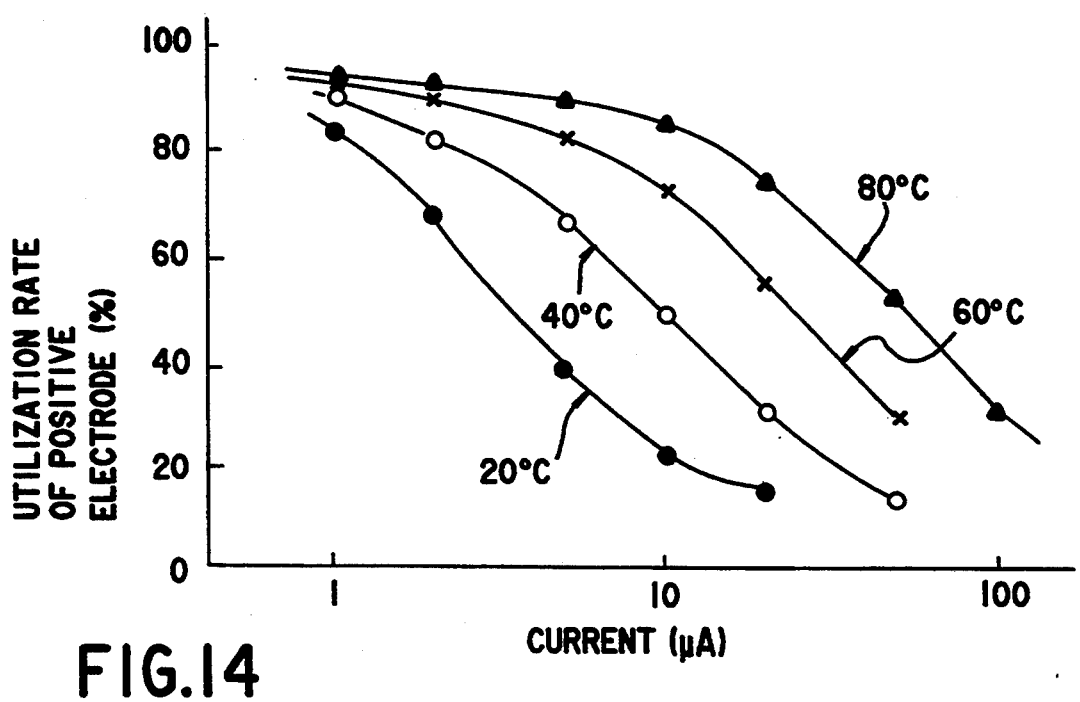
FIG. 14 is a graph showing the characteristics of the chemical cell.

On the other hand, FIG. 14 shows the discharge characteristics of the chemical cell 140. The graph indicates that the utilization rate of the positive electrode at a constant current value increases with a rise in the discharge temperature. Presumably, this is attributable to the fact that the velocity of moving ions in the electrolyte or in the positive electrode active substance increases with a rise in the temperature.

The increase in the utilization rate of the positive electrode means an increase in the discharge time of the chemical cell 140, so that required power is supplied by discharging the chemical cells 140 even when the generation of power by the devices 3 is interruped for a long period of time. The rise in the temperature also reduces the charge time of the chemical cells 140, permitting these cells to fully serve the function of secondary cells.

In the case of the micromachine 1B, the heat produced by the photoelectromotive devices 3 is transferred to the chemical cells 140 to raise the temperature of the cells 140, so that the heat capacity of the chemical cells 140 reduces the rise in the temperature of the devices 3. Additionally, the discharge characteristics of the chemical cells 140 are also improved.

Consequently, the present system realizes power supply with a higher conversion efficiency and higher stability than power supply systems wherein photoelectromotive devices 3 only are provided or such devices 3 and chemical cells 140 are arranged separately. Moreover, the heat produced by the devices 3 is blocked by the chemical cells 140 and almost completely prevented from being transported to the internal electronic circuit 18. This reduces the rise in the temperature of the circuit 18 and prevents the circuit 18 from malfunctioning.

Single-crystal Si solar cells are usable as the photoelectromotive devices 3. The chemical cells 140 are not limited to secondary cells but can be primary cells. This similarly produces an effect to improve the discharge characteristics.

The foregoing description of the embodiments is intended to illustrate the present invention and should not be construed as limiting the present invention as defined in the appended claims or reducing the scope thereof. Furthermore, the components of the present machine are not limited to those of the embodiments in construction but can of course be modified variously by one skilled in the art without departing from the spirit of the invention set forth in the claims.

What is claimed is:

1. A micromachine having an operation system driven by electric power, said micromachine comprising:

a plurality of independent energy power-converting means for receiving each of different forms of energy and converting each of the different forms of energy to electric power, respectively;

said energy-power converting means being selected from the group consisting of a photovoltaic device operative to convert light energy to electric power, an antenna and a microwave-power converter operative to convert microwave energy to electric power, an acousto-electromotive device operative to convert sound energy to electric power, and a secondary winding operative to convert lines of magnetic force to electric power; and means for supplying the electric power to said operation system.

2. A micromachine as defined in claim 1 which further comprises means for accumulating the electric power obtained from each of the energy-power converting means.

3. A micromachine as defined in claim 1 which has a body comprising a tubular trunk portion and a tapered portion projecting from a front end or rear end of the trunk portion coaxially therewith, one of the energy-power converting means comprising photovoltaic devices arranged over and covering at least the surface of the tapered portion of the machine body.

4. A micromachine as defined in claim 3 wherein the photovoltaic devices are arranged over and cover the surface of the tapered portion of the machine body and a surface of the trunk portion thereof, and the machine body has optical means projecting therefrom whereby light rays traveling toward a space between the surface of the trunk portion and the inner wall of a pipe axially of the pipe are deflected toward the photovoltaic devices over the trunk portion surface.

5. An electric power system for a micromachine having a body and an operation system incorporated in the body and operative to impart movement to said micromachine inside a pipe, the electric power system comprising:

a plurality of independent energy-power converting means mounted on the machine body for receiving each of different forms of energy and converting each of the different forms of energy to electric power, respectively;

said energy-power converting means being selected from the group consisting of a photovoltaic device operative to convert light energy to electric power, an antenna and a microwave-power converter operative to convert microwave energy to electric power, an acousto-electromotive device operative to convert sound energy to electric power, and a secondary winding operative to convert lines of magnetic force to electric power;

a first energy transmitting source arranged at an inlet of the pipe and for transmitting energy of light rays and/or microwaves which advance inside the pipe while being reflected on an inner wall surface of the pipe, and/or, a second energy transmitting source arranged at an intermediate portion of the exterior of said pipe and for transmitting energy of magnetic force lines and/or sound waves which penetrate through a pipe wall into the pipe; and means mounted on the machine body for supplying the electric power to said operation system.

6. A micromachine having a body and an electronic circuit incorporated therein for executing a predetermined operation involving travel of said micromachine through a constricted portion, the micromachine comprising:

photovoltaic devices covering an outer peripheral surface of the body for receiving transmitted energy waves and for converting said energy waves to an electromotive force;

means for supplying said electromotive force to the electronic circuit; and a heat sink provided on an outer peripheral portion of the machine body and having a base end in contact with a heat generating portion inside the machine and an outer end projecting outward from the machine to contact a wall surface defining the constricted portion.

7. A micromachine as defined in claim 6 wherein the heat sink comprises a plurality of drive legs at spaced locations along said body and means for extending and retracting said drive legs in a predetermined sequence for moving the machine body by sequentially engaging the wall surface defining the constricted portion.

8. A micromachine having a body and an electronic circuit incorporated therein for executing a predetermined operation, the micromachine being characterized in that it comprises photovoltaic devices covering an outer peripheral surface of the body, and chemical cells provided inside the body in back-to-back relation on the rear side of the respective photovoltaic devices, and means for supplying an electromotive force from the photovoltaic devices and the chemical cells to the electronic circuit.

9. A micromachine as defined in claim 8 wherein the chemical cells are secondary cells and charged with the electromotive force of the photovoltaic device.

* * * * *